Dec. 31, 1968     T. R. DICKINSON     3,419,448
METHOD OF PATCHING CERAMIC LINED EQUIPMENT AND PATCH THEREFOR
Filed Oct. 7, 1963
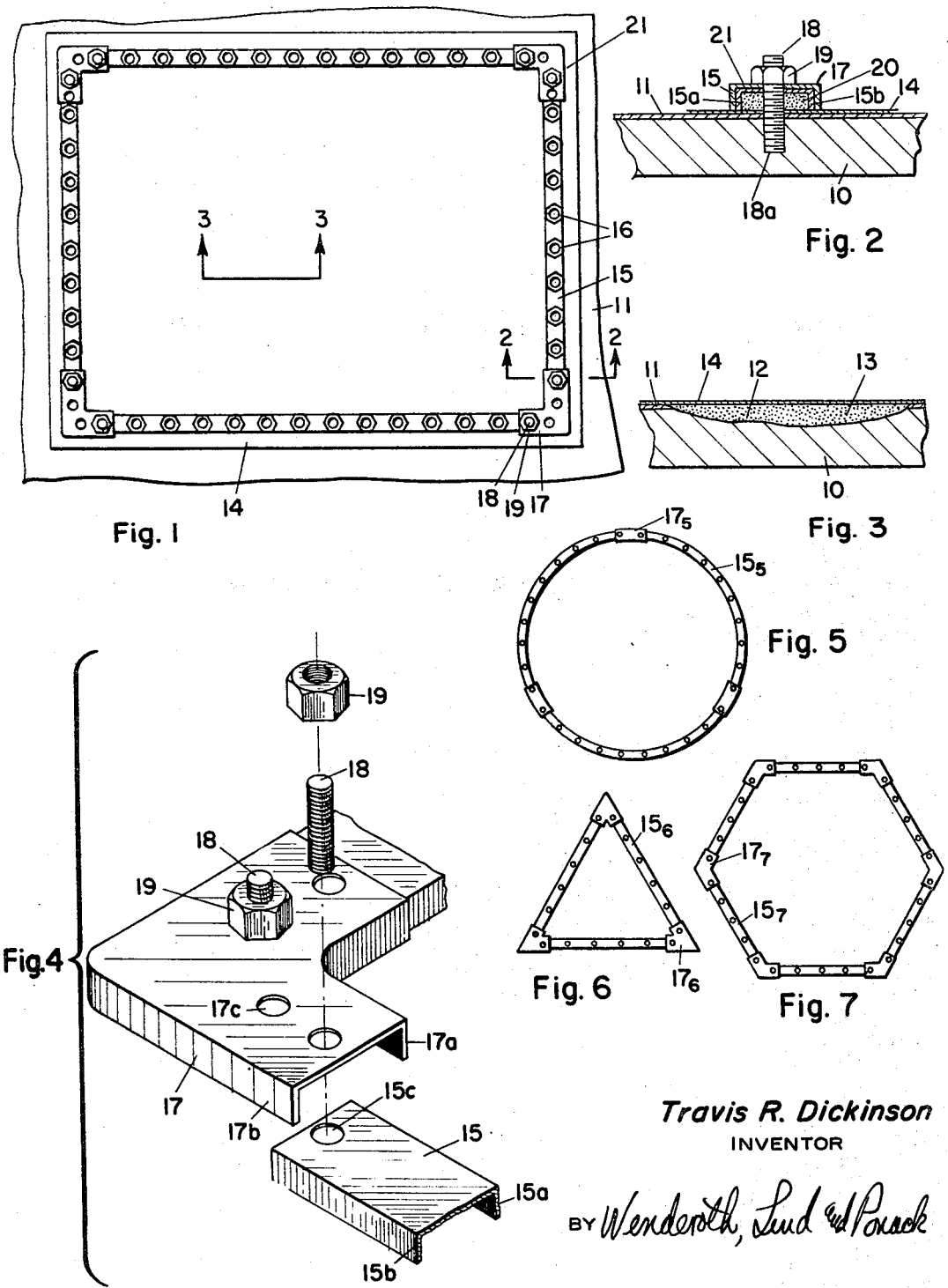
Travis R. Dickinson
INVENTOR
BY Wenderoth, Lind and Ponack
ATTORNEYS

United States Patent Office 3,419,448
Patented Dec. 31, 1968

3,419,448
METHOD OF PATCHING CERAMIC LINED
EQUIPMENT AND PATCH THEREFOR
Travis R. Dickinson, Mobile, Ala., assignor to Geigy Chemical Corporation, Ardsley, N.Y., a corporation of Delaware
Filed Oct. 7, 1963, Ser. No. 314,396
9 Claims. (Cl. 156—94)

This invention relates to a method of patching ceramic lined equipment, for example glass lined tanks, and to a patch which is particularly adapted for patching such equipment.

Heretofore, in patching damaged areas of ceramic lined equipment, such as a glass lined tank, the damaged area has been repaired with a patching cement which is not affected by the material handled by the equipment, and then the whole area has been covered with a gasket of a thin, flexible, resilient material, which is also unaffected by the material being handled by the equipment. A material frequently recommended for such a gasket is Teflon, a tetrafluoroethylene plastic made by E. I. du Pont de Nemours and Co. Thereafter, the gasket is covered by a patch of thin metal which has been shaped to conform to the shape of the lining of the equipment. A metal which is very satisfactory as such a patch is tantalum, since it is unaffected by most materials. Thereafter, studs are mounted in the wall of the equipment by grinding holes through the ceramic lining and drilling and tapping holes in the holes in the wall of the equipment. The gasket and patch are mounted over the studs and nuts are tightened down against the patch to secure it to the equipment wall.

While this type of patch is generally adequate for small damaged areas, it cannot be used for areas which are large because of the limitations on the sizes of thin sheets of tantalum which are available and the difficulty in shaping the sheets to conform to the shape of the equipment. Moreover, even with small damaged areas, the patch is expensive because the tantalum sheets are expensive. They are also difficult to shape accurately so as to conform to the shape of the wall of the equipment so as to hold the gasket in position accurately and securely.

It is an object of the present invention to provide a method of patching a damaged area of a ceramic lined equipment and a patch therefor which can be applied to relatively large damaged areas of the wall.

It is a further object of the present invention to provide a method of patching and a patch which holds the gasket securely against the ceramic liner regardless of the size of the patch.

It is a still further object of the present invention to provide a method of patching and a patch which uses a relatively small amount of expensive tantalum, and is therefore much less expensive than patches heretofore used.

Other and further objects of the present invention will become apparent from the following specification and claims, taken together with the accompanying drawings, in which:

FIG. 1 is a plan view of a patch according to the present invention;

FIG. 2 is a sectional view taken on line 2—2 of FIG. 1;

FIG. 3 is a sectional view taken on line 3—3 of FIG. 1;

FIG. 4 is an exploded perspective view, on an enlarged scale, of a joining member for the patch according to the invention; and FIGS. 5–7 are plan views, on a smaller scale, of different shapes which can be given to the patch according to the invention.

As seen in FIG. 2, the wall 10 of a piece of equipment has a ceramic lining 11, such as glass. When the wall is damaged, the glass lining 11 is destroyed, and some of the material of the wall, which is usually metal, is also destroyed, leaving a cavity 12. The first step in applying the patch is usually to clean the cavity, and then just prior to the final application of the patch, the cavity is filled with a patching cement 13 which is unaffected by the material being handled by the equipment. A material often used is Alkor cement, and acid-, alkali-, and solvent-resistant cement of the furane resin type made by Atlas Mineral Products Co.

Referring to FIGS. 1–4, the patch itself comprises a gasket 14 of thin sheet material which is flexible and resilient and is not affected by the material being handled by the equipment. A particularly suitable material for the gasket 14 is Teflon. The gasket is cut so that the surface thereof which lies against the wall will overlie the damaged portion of the wall and will extend over the ceramic lining 11 around the damaged portion. Preferably the gasket is given a regular geometric shape, which in the embodiment shown in FIGS. 1–4 is rectangular.

The patch further comprises a gasket clamp generally indicated at 21, which is in the form of a closed figure and which is of a rigid material which is unaffected by the material being handled by the equipment. A material which is particularly suitable is tantalum. The gasket clamp 21 is made up of gasket holding members 15, which in the embodiment of FIGS. 1–4 are straight channel members having an inverted U-shaped cross section and with two depending edges 15a and 15b which are positioned in sealing engagement against the surface of the gasket 14 which faces away from the wall. Holding members 16 of the same material as the gasket holding members are spaced along the gasket holding members 15 at close intervals. For example, when the spacing between the depending edges is 1 inch, the spacing of the holding members 16 can be 1½ inches. In the present embodiment, the holding members 16 are studs which extend through holes in the gasket holding members 15, through holes in the gasket 14, through holes ground through the ceramic lining 11, and into holes drilled and tapped in the wall 10. Nuts are threaded on the studs and pulled down tightly against the gasket holding members 15.

The gasket holding members 15 are positioned to form the sides of a rectangle and are spaced slightly inwardly of the periphery of the gasket 14. Joining members 17 of the same material as the gasket holding members are provided which join the gasket holding members to each other to complete the closed figure. The joining members 17, as best seen in FIG. 4, are corner members having at least two depending edges 17a and 17b and having an inverted U-shaped cross section, the internal cross sectional profile of which corresponds to the external cross sectional profile of the gasket holding members 15. The joining members thus fit over the gasket holding members and hold them in position. Apertures 17c are provided in the joining members through which holding members in the form of studs 18 of the same material as the joining members extend into tapped holes 18a in the wall 10 through holes in the gasket 14 and holes ground in the glass lining 11. The holding members are completed by nuts 19 of the same material as the studs which are tightened down against the joining members. It will be seen that the holes 17c at the ends of the joining members 17 will correspond with the holes 15c in the ends of the gasket holding members 15, so that a single holding means can hold both the gasket holding member 15 and the joining member at the position where these members overlap.

It will of course be appreciated that while the joining members 17 have been shown as overlying the ends of the gasket holding members, the joining members could also be made to fit within the gasket holding members and would function in the same way.

The patch can further comprise a cement filling 20 within the gasket holding members 15 and the joining members 17. While the depending edges of each of these members act to seal the gasket 14 against the ceramic lining of the wall, it is often desirable to provide a seal which is broader than the narrow edges. The cement filling provides such a seal. The cement filling can be of the same material as the cement patch 13, for example Alkor cement.

The closed figure formed by the gasket clamp can of course have shapes other than a rectangle. As seen in FIG. 5, the gasket holding members $15_5$ are curved and are joined by the joining members $17_5$ into a circular closed figure. The closed figure could also be defined by curved gasket holding members and be other than circular in shape.

As seen in FIG. 6, the gasket holding members $15_6$ are straight, but there are only three of them, and they are joined by joining members $17_6$ into a triangular closed figure.

As seen in FIG. 7, the gasket holding members $15_7$ are also straight, but there are six of them, and they are joined by joining members $17_7$ into a hexagonal closed figure. The closed figure could also be given other polygonal shapes.

In applying the patch according to the invention to the wall of the equipment, the gasket is first cut to the proper size, and then the proper length and shape gasket holding members 15 are chosen so that when they are placed over the gasket they will lie along the gasket adjacent the periphery thereof. The joining members are then selected to join the gasket holding members properly to form the proper shape closed figure.

Thereafter, the patch is laid out over the damaged area and the positions of the holes for the holding means are marked and holes are ground through the ceramic lining and drilled and tapped in the wall 10. The studs are then screwed into the tapped holes.

The damaged portion of the wall is then filled with the patching cement 13, and the gasket 14 is placed on the studs over the damaged portion of the wall. The gasket holding members 15 and the joining members 17 are then placed on the studs, and the nuts are threaded onto the studs and tightened down to tighten the gasket holding members 15 against the gasket 14 and the gasket 14 against the ceramic liner 11 around the damaged area.

If the gasket holding members 15 and the joining members 17 are to be filled with a cement filling 20, the cement filling is placed in the gasket holding members 15 and the joining members 17 before they are placed on the studs.

There is thus provided a patch for a ceramic lined piece of equipment which can be applied to a large area of the wall, since the gasket can be made in any size and the gasket holding members can be made as long as necessary and can be arranged with the joining members to form substantially any shape of closed figure. Only the edges of the gasket require metal holding means, the center of the patch being only the gasket material. A further advantage of the patch according to the invention is that since only the edges of the patch have any metal therein, the central area of patch is free to expand and contract easily to some extent with changes in temperature of the equipment and the material being handled thereby. In the prior art patches where the gasket is completely covered by a metal sheet, the expansion and contraction was extremely limited, which is a further reason why the prior art patches can not be used for very large damaged areas.

In addition to the advantages enumerated above, there is the further advantage that the action of the gasket holding members and the joining members provides a double seal around the edge of the gasket. This insures that the material being handled by the equipment will not reach the exposed damaged area. The sealing effect is enhanced by the cement filling in the gasket holding members and joining members.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely preferred embodiments thereof.

What is claimed is:

1. A patch for covering a damaged portion of a ceramic lined wall of a piece of material handling equipment, comprising a gasket of thin sheet material which is flexible and resilient and unaffected by the material being handled in the equipment, a gasket clamp of a rigid material which is unaffected by the material being handled and is in the form of a closed figure and having at least two depending edges positioned against one surface of the gasket adjacent the periphery thereof, the other surface of the gasket being adapted to overlie the damaged portion of the wall and to extend over the ceramic lining around the damaged portion, and clamp securing means extending through the gasket clamp and adapted to extend into the wall of the piece of equipment and secure the gasket clamp against the gasket and the gasket over the damaged portion of the wall and lining.

2. A patch as claimed in claim 1 in which said gasket clamp has a cross sectional shape in the form of an inverted U.

3. A patch as claimed in claim 1 in which said gasket clamp comprises a plurality of gasket holding members each having at least two depending edges, and a plurality of joining members each having at least two depending edges and having an interior cross sectional profile which is the same as the exterior cross sectional profile of said gasket holding members, said joining members fitting over the adjacent ends of the gasket holding members and joining the gasket holding members to each other to complete the closed figure.

4. A patch as claimed in claim 3 in which said gasket holding members each have an inverted U-shaped cross section, and said joining members each have an inverted U-shaped cross section adapted to fit over the outside of adjacent ends of the gasket holding members and joining the gasket holding members to each other to complete the closed figure, and said clamp securing means comprises a plurality of studs extending through said gasket holding members and through said gasket holding members and joining members where they overlap, and nuts threaded on said studs.

5. A patch as claimed in claim 4 in which said gasket holding members, said joining members, said studs and said nuts are all of tantalum.

6. A patch as claimed in claim 4 in which the interior of said gasket clamp is filled with a patching material which is unaffected by the material being handled in the equipment.

7. A method of covering a damaged portion of a ceramic lined wall of a piece of material handling equipment, comprising filling the damaged portion of the wall with a patching cement which is unaffected by the material being handled by the equipment, covering the damaged portion of the wall and a portion of the surrounding ceramic lining with a gasket of thin sheet material which is flexible and resilient and which is unaffected by the material being handled in the equipment, placing a gasket clamp of a rigid material which is unaffected by the material being handled and which is in the form of a closed figure and having at least two depending edges over the gasket adjacent the periphery thereof, and securing said gasket clamp to the wall of the equipment for clamping the gasket tightly against the ceramic lining around the damaged portion of the wall.

8. A method as claimed in claim 7 in which the step of securing the gasket clamp to the wall of the equipment comprises passing studs through the gasket clamp, gasket and lining at closely spaced intervals and threading them tightly into the wall of the equipment, and then threading nuts onto said studs and tightening them against said gasket clamp.

9. A method as claimed in claim 7 in which the gasket clamp has an inverted U cross-sectional shape, and said method further comprises filling the interior of said gasket clamp with a patching cement.

References Cited

UNITED STATES PATENTS

| | | | |
|---|---|---|---|
| 2,631,360 | 3/1953 | Sanford et al. | 29—401 |
| 1,180,614 | 4/1916 | Simpson | 29—198 |
| 2,092,341 | 9/1937 | De Vries | 52—704 |
| 2,750,014 | 6/1956 | Gordon | 287—189.36 |
| 2,911,242 | 11/1959 | Bickerstaff | 287—54 |
| 3,034,612 | 5/1962 | Jourdan | 287—189.36 |

FOREIGN PATENTS 836,390  6/1960  Great Britain.

EARL M. BERGERT, *Primary Examiner.*

H. F. EPSTEIN, *Assistant Examiner.*

U.S. Cl. X.R.

29—401, 526; 220—63